United States Patent
Protz

(10) Patent No.: US 10,459,242 B2
(45) Date of Patent: Oct. 29, 2019

(54) METHOD AND DEVICE FOR CAPTURING AN IMAGE OF A TARGET OBJECT

(71) Applicant: MBDA Deutschland GmbH, Schrobenhausen (DE)

(72) Inventor: Rudolf Protz, Hoehenkirchen-Siegertsbrunn (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 306 days.

(21) Appl. No.: 15/165,886

(22) Filed: May 26, 2016

(65) Prior Publication Data

US 2016/0349529 A1 Dec. 1, 2016

(30) Foreign Application Priority Data

May 27, 2015 (DE) .................. 10 2015 006 798

(51) Int. Cl.
| | |
|---|---|
| *G02B 27/64* | (2006.01) |
| *G01S 17/10* | (2006.01) |
| *G01S 17/66* | (2006.01) |
| *G01S 17/89* | (2006.01) |
| *G02F 1/03* | (2006.01) |

(Continued)

(52) U.S. Cl.
CPC .......... *G02B 27/644* (2013.01); *G01S 17/107* (2013.01); *G01S 17/66* (2013.01); *G01S 17/89* (2013.01); *G02F 1/0311* (2013.01); *H04N 5/2256* (2013.01); *F41H 13/005* (2013.01)

(58) Field of Classification Search
None
See application file for complete search history.

(56) References Cited

U.S. PATENT DOCUMENTS

| 7,041,953 B2 | 5/2006 | Byren |
| 7,626,152 B2 | 12/2009 | King et al. |
| 8,218,589 B1 | 7/2012 | Saunders |

(Continued)

OTHER PUBLICATIONS

Csatari'Divall, M., et al. "Fast phase switching within the bunch train of the PHIN photo-injector at CERN using fiber-optic modulators on the drive laser." Nuclear Instruments and Methods in Physics Research Section A: Accelerators, Spectrometers, Detectors and Associated Equipment 659.1 (2011): 1-8. (Year: 2011).*

(Continued)

*Primary Examiner* — Clifford Hilaire
(74) *Attorney, Agent, or Firm* — Crowell & Moring LLP

(57) ABSTRACT

An image of a target object may be captured by a method in which the target object is illuminated by a pulsed laser beam emitted by an illumination laser, which beam is aimed at the target object in the form of an illumination beam by an illumination optics unit. The illumination beam laser light reflected from the target object may be received by a receiving optics unit and directed to an image capturing device to generate an image of the target object on the image capturing device. The method may also include detecting the angular offset of the image of the target object with respect to a reference axis of the receiving optics unit, and stabilizing the visual axis of the image capturing device detected by imaging of the target object device by a first optical correcting element of the receiving optics unit that compensates for the angular offset.

6 Claims, 1 Drawing Sheet

(51) Int. Cl.
*H04N 5/225* (2006.01)
*F41H 13/00* (2006.01)

(56) References Cited

U.S. PATENT DOCUMENTS

| | | | |
|---|---|---|---|
| 8,237,835 B1* | 8/2012 | Muller | A61B 3/1025 |
| | | | 250/201.9 |
| 2006/0022115 A1 | 2/2006 | Byren | |
| 2006/0033925 A1* | 2/2006 | Drabarek | G01B 11/2441 |
| | | | 356/479 |
| 2011/0237999 A1* | 9/2011 | Muller | A61F 9/008 |
| | | | 604/20 |
| 2014/0104607 A1* | 4/2014 | Treado | G01J 3/02 |
| | | | 356/301 |
| 2015/0268486 A1* | 9/2015 | Edler | G02F 1/0327 |
| | | | 372/12 |

OTHER PUBLICATIONS

German Office Action issued in German counterpart application No. 10 2015 006 798.2 dated Mar. 7, 2016 (Five (5) pages).
European Search Report issued in European counterpart application No. 16 171 024.9 dated Sep. 28, 2016 (Four (4) pages).
Rockwell D A et al., "Real-time atmospheric compensation using stimulated Brillouin scattering phase conjugation", Lasers and Electro-Optics Society Annual Meeting, 1993. LEOS '93 Conference Proceedings. IEEE San Jose, CA, USA Nov. 15-18, 1993, New York, NY, USA, IEEE, Nov. 15, 1993, XP010129281, pp. 98-99.

\* cited by examiner

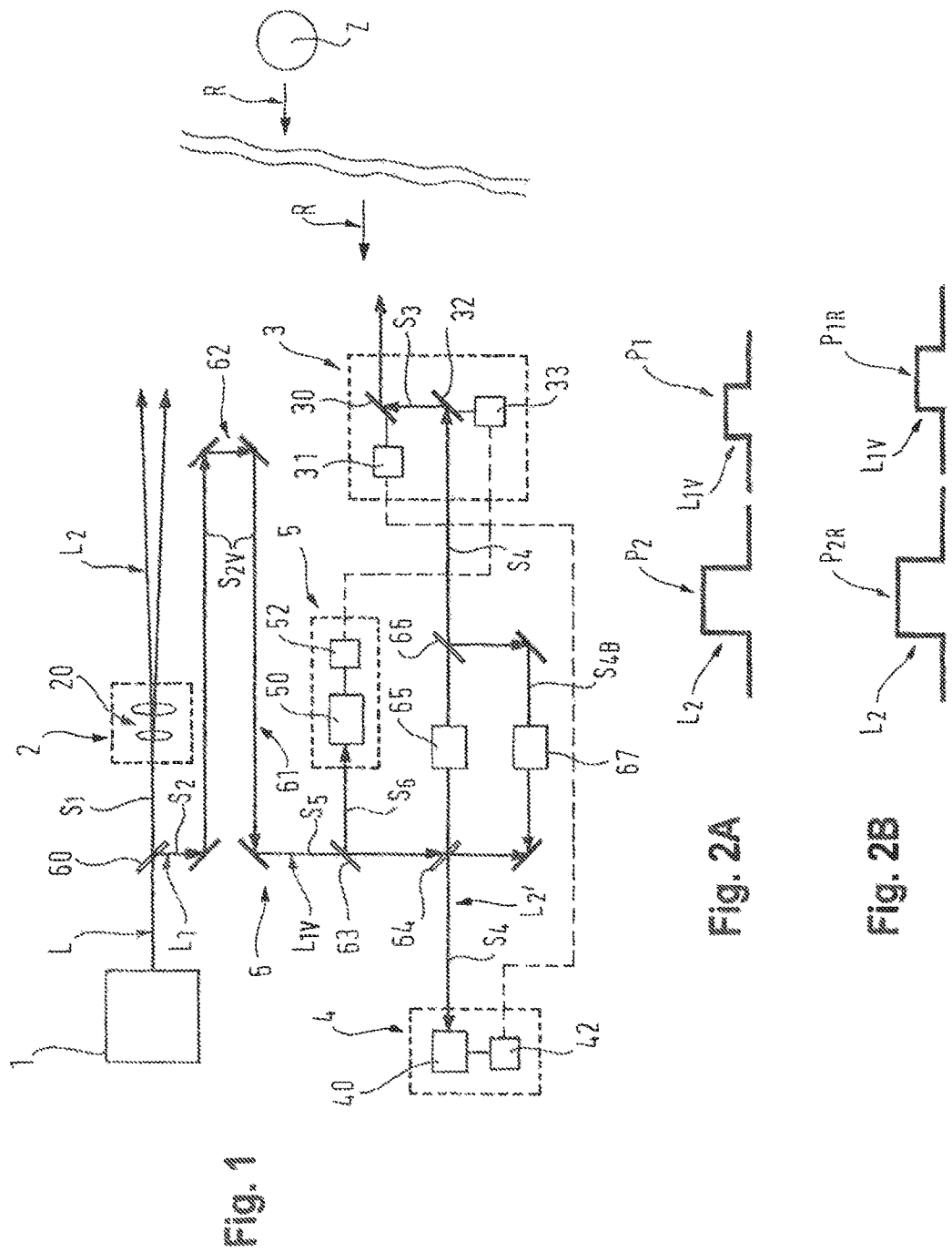

METHOD AND DEVICE FOR CAPTURING AN IMAGE OF A TARGET OBJECT

CROSS REFERENCE TO RELATED APPLICATIONS

This application claims priority of German patent application No. 10 2015 006 798.2, filed May 27, 2015, the entire disclosure of which is herein incorporated by reference.

FIELD OF THE INVENTION

The present invention relates to a method for capturing an image of a target object illuminated by an illumination laser. It relates further to a device for capturing the image which operates according to the inventive method.

BACKGROUND OF THE INVENTION

Methods and devices are used to capture distant moving objects, such as flying objects, and to track their flight paths. In the course of this target tracking, the entire device, or at least an aiming system of said device is moved to follow the flight path of the target object so that said target object can be reproduced as constantly as possible at a location of the image capturing device. Tracking errors are associated with this following method, manifesting themselves as "juddering" of the image, for example. Moreover, imaging errors can also be caused by atmospheric turbulence. Higher order imaging aberrations can also occur, thereby limiting the achievable optical resolution of the image displayed on the image capturing device.

In order to correct these deficiencies, it is already known to analyse the angular offset of the object displayed on the image capturing device, and to shift at least one first optical correcting element in the receiving optics units as a function of the result of this analysis. This shift of the first optical correcting element takes place in a closed control circuit with the analysis of the angular offset. Such image stabilisation is thus performed using the light of the illumination laser which is reflected by the target object.

In addition, a second laser is typically provided, which emits laser light of a different wavelength from the wavelength of the illumination laser, and the laser light of which is also aimed at the target object. The light from this second laser which is reflected by the target object is used to compensate for the image resolution limitation caused by the higher order imaging aberrations by providing a wave front sensor to receive said reflected light of the second laser and generate a correction signal, which acts on at least one second optical correcting element in the closed control circuit.

SUMMARY OF THE INVENTION

An object of the present invention is to describe a species-related method and a species-related device, with which it is possible to stabilise the image and correct higher order imaging aberrations while at the same time reducing equipment requirement and thus also lowering costs.

A method according to the invention for capturing the image of a target object illuminated by an illumination laser has the following steps:

a) Illuminating the target object by means of a pulsed laser beam emitted by an illumination laser, which beam is aimed at the target object in the form of an illumination beam by an illumination optics unit;

b) Receiving the illumination beam laser light reflected from the target object by means of a receiving optics unit;

c) Directing the received reflected illumination beam laser light to an image capturing device to generate an image of the target object on the image capturing device;

d) Detecting the angular offset of the image of the target object with respect to a reference axis of the receiving optics unit;

e) Stabilising the visual axis of the image capturing device detected by imaging of the target object device by means of a first optical correcting element of the receiving optics unit that compensates for the angular offset.

In this context, the following steps are also carried out to stabilise the imaging of the target object:

a'1) Decoupling a partial beam from the laser beam emitted by the illumination laser;

a'2) Delaying the decoupled partial beam in an optical delay device;

a'3) Illuminating the target object by means of the partial beam that is directed at the target object by the receiving optics unit;

b'1) Receiving the partial beam laser light which is reflected by the target object and which defines a reference wavefront, by the receiving optics unit;

b'2) Decoupling the received reflected partial beam laser light from the light that is received by the receiving optics unit;

c') Directing the decoupled reflected partial beam laser light to a wavefront sensor;

d') Detecting a wavefront error in the received reflected partial beam laser light, and e') Fine tuning the receiving optics unit to compensate for the detected wavefront error by means of a second optical correcting element of the receiving optics unit.

By splitting off the partial beam from the pulsed laser beam of the illumination laser and by delaying the partial beam laser light is delayed, it becomes possible to distinguish between the laser light that is aimed at the target object through the illumination beam by means of the illumination optics unit and reflected therefrom, and the laser light that is reflected from the target object due to the partial beam laser light that is guided "backwards" through the receiving optics unit, so that the light from both that is reflected by the target object can be distinguished from the pulsed light beams that have been temporally offset by the optical delay device, so that it is thus possible not only to stabilise the image but also to compensate for the higher order imaging aberrations by means of a single illumination source.

It is preferably provided in the method according to the invention that step b'$_2$) of decoupling the received reflected partial beam laser light from the light that is received by the receiving optics unit is carried out by means of Pockels cells, which are actuated synchronously to assure clocking of the pulsed laser beam emitted by the illumination laser.

According to one embodiment, a device is characterised by an illumination laser which is designed to emit a pulsed laser beam;

an illumination optics unit provided in the beam path of the laser beam emitted by the illumination laser;

a receiving optics unit for the laser light reflected from the target object;

an image capturing device, to which the receiving optics unit directs the reflected laser light it receives;

a first beam splitter provided between the illumination laser and the illumination optics unit, which diverts a partial beam out of the pulsed laser beam generated by the illumination laser;

an optical delay device, into which the partial beam is guided by the first beam splitter;

a first polarisation beam splitter arranged in the path of the beam exiting the optical delay device and in the beam path between the receiving optics unit and the image capturing device;

a second polarisation beam splitter provided in the beam path between the first polarisation beam splitter and the receiving optics unit;

a first Pockels cell provided between the first polarisation beam splitter and the second polarisation beam splitter;

a second Pockels cell provided parallel to the first Pockels cell, which is arranged in a bypass beam path formed between the first polarisation beam splitter and the second polarisation beam splitter;

a wavefront sensor, which is arranged in a beam path split off from the beam path between the first polarisation beam splitter and the delay device by a second beam splitter; wherein the receiving optics unit has one rapidly adjustable mirror and one adaptive mirror in its inner beam path, wherein the image capturing device has an image analyser that sends an adjustment signal to an adjustment device for the rapidly adjustable mirror, and wherein the wavefront sensor has a wavefront error analyser which generates a correction signal and forwards it to an adjustment device of the adaptive mirror.

By combining the first beam splitter provided in the pulsed laser beam emitted by the illumination laser, the optical delay device, and the beam path which is switchable by mean of the Pockels cells, it is possible to arrive at the method according to the invention, such that in contrast to the prior art only a single laser is required to carry out image stabilisation and also correct the higher order imaging aberrations.

The illumination optical device preferably has a beam diverging optics unit. This ensures that the laser beam reliably reaches the target object and illuminates it effectively.

It is particularly advantageous if the wavefront sensor is in the form of a Hartmann-Shack sensor.

Advantageously, the transmission direction of the first polarisation beam splitter is aligned perpendicularly to the transmission direction of the second polarisation beam splitter.

Also preferably, the image capturing device is equipped with a fine tracking camera or is in the form of a fine tracking camera that is designed to operate in the range gating mode.

Preferred embodiments of the invention with additional configuration details and further advantages are described and explained in greater detail in the following, with reference to the accompanying drawings.

BRIEF DESCRIPTION OF THE DRAWINGS

FIG. 1 shows a schematic construction of a device according to the invention;

FIG. 2A is a time-related representation of the two pulsed laser light beams aimed at the target object; and FIG. 2B is a time-related representation of the two pulsed laser light beams received after being reflected from the target object.

DESCRIPTION OF THE PREFERRED EMBODIMENTS

FIG. 1 shows an example of a device according to the invention for capturing the image of a target object. With this device it is possible to obtain high resolution optical images of moving target objects, for example flying objects, by laser illumination. It includes an adaptive optics system and operates according to the method according to the invention, which will be described subsequently.

Typical components of the device are an illumination laser 1, an illumination optics unit 2, a receiving optics unit 3, an image capturing device 4 and a wavefront sensor device 5. The particular feature of this inventive device is a partial radiation guide device 6, which will be described in detail below.

Illumination laser 1 is designed to emit a pulsed laser beam L. Said laser beam L emitted by illumination laser 1 toward illumination optics unit 2 constitutes a first beam path $S_1$ between illumination laser 1 and illumination optics unit 2. Illumination laser 1 preferably generates a polarised laser radiation (e.g., pp) in the wavelength range of visible light to near infrared, pulsed for example with a typical pulse length in the range of ten nanoseconds and with a pulse repetition rate greater than 100 pulses per second.

A first beam splitter 60 of partial radiation guide device 6 is provided in the first beam path $S_1$ between illumination laser 1 and illumination optics unit 2, and separates a partial beam $L_1$ from the pulsed laser beam L generated by illumination laser 1 and diverts it into a second beam path $S_2$. In this way, a small proportion (approx. 10%) of the radiation of laser beam L is transferred to partial beam $L_1$. The remaining radiation component of laser beam L is forwarded as illumination beam $L_2$ to illumination optics unit 2, in which it is caused to diverge slightly by means of a beam diverging optics unit 20 and directed at target object Z. The radiation angle of illumination lasers 2 is set via the beam diverging optics unit 20 to 1 mrad beam divergence, for example. Illumination beam $L_2$ is directed at and follows target object Z, for example a flying object, by means of an aiming system—not shown in FIG. 1—with a Coude beam guide, in such manner that the surface of target object Z is illuminated over a large area.

Receiving optics unit 3 receives the laser light R reflected from target object Z and guides it along an inner beam path $S_3$, in which a rapidly adjustable mirror 30 is arranged as a first optical correcting element, and an adaptive mirror 32 is provided as a second optical correcting element. Receiving optics unit 3 guides the received laser light R that has passed through it farther along a fourth beam path $S_4$ to image capturing device 4. The laser light R that is backscattered from illuminated target object Z is received by a receiving optics unit 3 which has the form of a telescopic optical unit arranged on an aiming system used to track a target, and is guided along beam path $S_4$ via a Coude beam guide to rapidly adjustable mirror 30 and farther along the beam path to image capturing device 4, which includes a fine tracking camera 40, for example, which displays the target object.

Image capturing device 4 further includes an image analyser 42, which actuates an adjustment device 31 of the rapidly adjustable mirror 30 with an adjustment signal. The image information obtained with fine tracking camera 40 is analysed using known image processing methods to detect the angular offsets of the displayed target object relative to the reference axis. These angular offsets are then used to actuate the rapidly adjustable mirror 30, which stabilises the visual axis of the fine tracking camera 40 in the closed control circuit. This stabilisation of the visual axis effectively minimises the harmful effect of temporally variable image motion on the quality of the imaging delivered by fine tracking camera 40. Such image motion is caused by tracking errors of the aiming system and the effects of atmospheric turbulence on the beam propagation path to the target object and back.

Besides image motion, atmospheric turbulence also causes higher order imaging aberrations, which limit the optical resolution that is achievable with the fine tracking camera 40. Adaptive mirror 32 is used to correct these imaging errors, as will be described subsequently.

The partial beam $L_2$ that is separated by first beam splitter 60 is guided along the second beam path $S_2$ to an optical delay device 62. An inner beam path $S_{2V}$ is formed inside optical delay device 62, representing an optical delay path 61, which is preferably longer than 3 m.

The delayed partial beam $L_{1V}$ exiting from delay device 62 is guided along a further beam path $S_5$ to a first polarisation beam splitter 64 in fourth beam path $S_4$ arranged between receiving optics unit 3 and image capturing device 4.

In the fourth beam path $S_4$, a second polarisation beam splitter 66 is provided between first polarisation beam splitter 64 and receiving optics unit 3, and a first Pockels cell 65 is arranged between the first polarisation beam splitter 64 and the second polarisation beam splitter 66. Parallel to the first Pockels cell 65, a second Pockels cell 67 is arranged in a bypass beam path $S_{4B}$ created between first polarisation beam splitter 64 and second polarisation beam splitter 66.

Wavefront sensor device 5 includes a wavefront sensor 50 arranged in a wavefront sensor beam path $S_6$ that is separated from the further beam path $S_5$ by a second beam splitter 63 between delay device 62 and first polarisation beam splitter 64.

Wavefront sensor device 5 includes a wavefront error analyser 52, which is designed to generate a correction signal and forward said signal to an adjustment device 33 of adaptive mirror 32. The adaptive mirror 32 is adjusted in the closed control circuit according to usual processes of the adaptive optics unit by means of the correction signal generated by the wavefront error analyser 52 associated with wavefront sensor 50. For this purpose, wavefront sensor 50 measures the wavefront errors caused by turbulence on the optical propagation path, and the wavefront error analyser 52 in the form of an electronic assembly arranged downstream therefrom 52 determines the correction signals from the result of the measurement. A "Hartmann-Shack sensor" for example may be used as the wavefront sensor.

A single point light source is needed on target object Z so that the wavefront errors can be measured with wavefront sensor 50. This light source generates the reference wavefront, which passes along the imaging path of fine tracking camera 40 ($S_3$, $S_4$) until it reaches wavefront sensor 50. This radiation is decoupled before fine tracking camera 40 and diverted along the further beam path $S_5$ via first polarisation beam splitter 64, and then diverted along wavefront sensor beam path $S_6$ to wavefront sensor 50 via the second beam splitter 63.

Illumination laser 1 is also used to generate the single point light source on target object Z, specifically by directing the delayed partial radiation $L_{1V}$ toward target object Z over the same optical path used for the imaging by fine tracking camera 40 and wavefront measurement via wavefront sensor 50. Partial radiation $L_{1V}$ is thus guided "backwards" to target object Z via receiving optics unit 3. Thus, the stabilisation of the beam axis described earlier serves to keep the generation of the single point light source in a fixed position on target object Z, wherein the position can be chosen freely using the image from fine tracking camera 40.

The partial radiation guide device 6 provided according to the invention is used to couple the delayed partial radiation $L_{1V}$ into the optical path of fine tracking camera 40 and to decouple the radiation reflected by the target object Z from the single point light source generated thereon from the optical path of the fine tracking camera 40. It consists of the optical delay device 62, the first Pockels cell 65 and the second Pockels cell 67. The purpose of this arrangement its to couple the delayed partial radiation $L_{1V}$ into the optical path (fourth beam path $S_4$) between the fine tracking camera 40 and the receiving optics unit 3, and to decouple the radiation reflected by the target object Z from the single point light source generated on the target object from the optical path between receiving optics unit 3 and fine tracking camera 40 as efficiently as possible so that the laser power required to illuminate target object Z is kept as low as possible.

To achieve this, the generation and the receiving of radiation components $L_1$ and $L_2$ of the laser radiation L generated by illumination laser 1, or the receiving of their reflections from target object Z, which serve as illumination for fine tracking camera 40 and wavefront sensor 50, are offset temporally. The temporal offset of said components is created with the aid of optical delay path 61 in delay device 62, which path is preferably longer than 3 m such that the laser pulses are offset temporally due to their different transit times.

Since partial radiation $L_1$ is less intense than the radiation of illumination beam $L_2$, the more intense pulses $P_2$ of the emitted illumination beam $L_2$ and the pulses $P_1$ of the delayed partial radiation $L_{1V}$ emitted with a temporal offset thereto are readily distinguishable, as is evident in FIG. 2A. Consequently, pulses $P_{1R}$ of the received reflected partial radiation $L_{1V}$ and pulses $P_{2R}$ of the received reflected illumination radiation $L_2'$ are also readily distinguishable, as is shown in FIG. 2B. The use of a separate laser to generate the single point light source is therefore not necessary in the inventive device described here.

The pp-polarised, delayed partial radiation $L_{1V}$ is coupled into the optical path of fine tracking camera 40 via first polarisation beam splitter 64 before Pockels cells 65, 67, as is shown in FIG. 1. Second polarisation beam splitter 66 with a transmission direction perpendicular to that of first polarisation beam splitter 64 is mounted after the two Pockels cells 65, 67 in the direction of radiation.

In order to enable the radiation reflected from target object Z to be received by fine tracking camera 40 and wavefront sensor 50, the first Pockels cell 65 and the second Pockels cell 67 are actuated by suitable voltage pulses to emit laser pulses synchronously. As a result, the polarisation plane of the transmitted light that originates from illumination laser 1, that is to say from the reflected illumination radiation $L_2'$, is rotated through 90°. The transmission positions of the first Pockels cell 65 and the second Pockels cell 67 are arranged perpendicularly to one another (polarisation direction pp and sp, respectively).

The construction of the optical switching arrangement of the two Pockels cells 65, 67, of the first polarisation beam splitters 34 arranged at the intersection point of the fourth beam path $S_4$ with the further beam path $S_5$ and of the second polarisation beam splitter 36 dividing beam path $S_4$ on the side facing the receiving optics unit means that this optical switching arrangement is always passable for partial radiation $L_1$ "backwards", that is to say towards receiving optics unit 3, because when the laser pulses are emitted to illuminate target object Z for imaging by fine tracking camera 40 (illumination beam $L_2$) and, with a time delay relative thereto, to generate the single point light source on target object Z for wavefront measurement by wavefront sensor 50 (partial beam $L_1$), Pockels cells 65, 67 are not actuated. When first polarisation beam splitter 34 diverts the pp-polarised partial beam $L_1$, first Pockels cell 65 is open in the pp direction, meaning that it transmits the emitted laser pulse of partial radiation $L_1$, which then also passes through second polarisation beam splitter 36. Alternatively, the polarisation directions of polarisation beam splitters 34, 36 and of the Pockels cells 35, 37 may each be rotated through 90° as well.

After a period that is identical with twice the transit time of the laser light to target object Z, the polarisation directions of the Pockels cells 35, 37 are switched in synchronisation with the pulse clock of the radiation of illumination beam $L_2$ for the duration of the laser pulse, for example 10 nanoseconds; in the example illustrated, the first Pockels cell 65 is switched to transmission in sp polarisation direction and the second Pockels cell 67 is switched to transmission in pp polarisation direction. The reflected illumination radiation $L_2'$ (pp-polarised) passes through the second polarisation beam splitter 36 and is rotated into the sp polarisation plane in first Pockels cell 35. In this way, this polarisation-rotated, reflected illumination radiation $L_2'$ is also able to pass through first polarisation beam splitter 34 and is guided to the image capturing device 4. The optical path to receiving of the laser light that is backscattered from target object Z by fine tracking camera 40 is thus rendered clear. Consequently, the illumination radiation $L_2'$ reflected from target object Z is guided always and essentially without loss to image capturing device 4 by first polarisation beam splitter 34.

After the actuation voltage for the two Pockels cells 65, 67 is switched off, the polarisation planes of the received light are no longer rotated through 90°. The delayed laser light of the reflected partial beam $L_{1V}$ (pp-polarised) reflected from the single point light source on the target object therefore passes unaltered through the second polarisation beam splitter 36 and the first Pockels cell 35, and is decoupled by first polarisation beam splitter 64, which is arranged before fine tracking camera 40. 50% of the intensity thereof is then diverted to wavefront sensor 50 by means of second beam splitter 63.

The provision of two Pockels cells 65, 67, which are arranged parallel to one another by means of polarisation beam splitters 34, 36 and bypass radiation path $S_{4B}$ and are designed for polarisation planes that are rotated through 90° relative to each other, increases intensity of the radiation that is incident on image capturing device 4, particularly in the case in which the incoming, reflected radiation has been depolarised with respect to the emitted radiation, by reflection on target object Z, for example.

The device according to the invention described above is used to obtain image information with high optical resolution about distant moving targets with little optical radiation of their own. Harmful influences on the optical resolution of the images due to incorrect target tracking as well as atmospheric turbulence in the observation path are minimised by adaptive optics methods. One possible application for this device is fine tracking of flying targets in conjunction with a wide angle aiming system, in a laser weapon for example.

The method used may offer a further benefit in that fine tracking camera 40 is preferably operated in "range gating mode". This is advantageous for minimising background-induced noise in the image information.

Reference signs in the claims, the description and the drawings are intended purely to provide a better understanding of the invention and are not intended to limit the scope of protection.

LIST OF REFERENCE SIGNS

Elements are designated as follows:
1 Illumination laser
2 Illumination optics unit
3 Receiving optics unit
4 Image capturing device
5 Wavefront sensor device
6 Partial radiation guide device
20 Beam diverging optics unit
30 First optical correcting element (adjustable mirror)
31 Adjustment device
32 Second optical correcting element (adaptive mirror)
33 Adjustment device
34 Polarisation beam splitter
35 Pockels cell
36 Polarisation beam splitter
37 Pockels cell
40 Fine tracking camera
42 Image analyser
50 Wavefront sensor
52 Wavefront error analyser
50 Beam splitter
61 Delay path
62 Delay device
63 Beam splitter
64 Polarisation beam splitter
65 Pockels cell
66 Polarisation beam splitter
67 Pockels cell
L Laser beam
$L_1$ Partial beam
$L_{1V}$ Partial radiation
$L_2$ Illumination beam
$L_2'$ Reflected illumination radiation
$P_1$ Pulse
$P_{1R}$ Pulse
$P_{2R}$ Pulse
R Laser light
$S_1$ Beam path
$S_2$ Beam path
$S_{2V}$ Beam path
$S_3$ Beam path
$S_4$ Beam path
$S_{4A}$ Bypass beam path
$S_{4B}$ Bypass beam path
$S_5$ Beam path
$S_6$ Beam path
Z Target object

What is claimed is:

1. A method for capturing an image of a distant moving target object illuminated by an illumination laser comprising:

splitting a pulsed laser beam emitted by the illumination laser into an illumination beam and a partial beam between the illumination laser and an illumination optics unit;

illuminating the target object by means of the illumination beam, which illumination beam is directly aimed at the target object by the illumination optics unit;

receiving illumination beam laser light reflected from the target object by a receiving optics unit arranged separately from the illumination optics unit;

directing received reflected illumination beam laser light to an image capturing device to generate an image of the target object on the image capturing device;

detecting an angular offset of the image of the target object with respect to a reference axis of the receiving optics unit;

stabilizing a visual axis of the image capturing device detected by imaging of the target object by a first optical correcting element of the receiving optics unit that compensates for the angular offset;

wherein, for stabilize imaging of the target object, the method further comprises:

delaying the partial beam in an optical delay device;

illuminating the target object by means of the partial beam that is directed at the target object by the receiving optics unit;

receiving partial beam laser light which is reflected by the target object and which defines a reference wavefront by the receiving optics unit;

decoupling received reflected partial beam laser light from light that is received by the receiving optics unit;

directing decoupled reflected partial beam laser light to a wavefront sensor;

detecting a wavefront error in the received reflected partial beam laser light; and fine tuning the receiving optics unit to compensate for the wavefront error by means of a second optical correcting element of the receiving optics unit, wherein said decoupling the received reflected partial beam laser light from the light that is received by the receiving optics unit is carried out by Pockels cells that are actuated synchronously to assure clocking of the pulsed laser beam emitted by the illumination laser.

2. A device for capturing an image of a distant moving target object, the device comprising:

an illumination laser configured to emit a pulsed laser beam;

a first beam splitter provided in a beam path of the pulsed laser beam emitted by the illumination laser, configured to split the pulsed laser beam into an illumination beam and a partial beam;

an illumination optics unit provided in a beam path of the illumination beam for directly aiming the illumination beam at the target object;

a receiving optics unit arranged separately from the illumination optics unit for directing the partial beam at the target and for receiving illumination beam light and partial beam light reflected from the target object;

an image capturing device to which the receiving optics unit directs reflected laser light it receives;

an optical delay device, into which the partial beam is guided by the first beam splitter;

a first polarisation beam splitter arranged in a path of the beam exiting the optical delay device and in a beam path between the receiving optics unit and the image capturing device;

a second polarisation beam splitter provided in a beam path between the first polarisation beam splitter and the receiving optics unit;

a Pockels cell provided between the first polarisation beam splitter and the second polarisation beam splitter;

a second Pockels cell provided parallel the first Pockels cell, which is arranged in a bypass beam path formed between the first polarisation beam splitter and the second polarisation beam splitter; and a wavefront sensor, which is arranged in a beam path split off from a beam path between the first polarisation beam splitter and the optical delay device by a second beam splitter, wherein the receiving optics unit has one rapidly adjustable mirror and one adaptive mirror in its inner beam path, wherein the image capturing device has an image analyser that sends an adjustment signal to an adjustment device for the rapidly adjustable mirror, and wherein the wavefront sensor has a wavefront error analyser which generates a correction signal and forwards it to an adjustment device of the adaptive mirror.

3. The device according to claim 2, wherein the illumination optics unit has a beam diverging optics unit.

4. The device according to claim 2, wherein the wavefront sensor is formed by a Hartmann-Shack sensor.

5. The device according to claim 2, wherein a transmission direction of the first polarisation beam splitter is perpendicular to a transmission direction of the second polarisation beam splitter.

6. The device according to claim 2, wherein the image capturing device includes a fine tracking camera that is designed to operate in range gating mode.

* * * * *